United States Patent
Nishimura

(12) United States Patent
(10) Patent No.: US 10,344,135 B2
(45) Date of Patent: Jul. 9, 2019

(54) VINYL CHLORIDE RESIN COMPOSITION FOR POWDER MOLDING, VINYL CHLORIDE RESIN MOLDED PRODUCT, AND LAMINATE

(71) Applicant: ZEON CORPORATION, Chiyoda-ku, Tokyo (JP)

(72) Inventor: Shota Nishimura, Tokyo (JP)

(73) Assignee: ZEON CORPORATION, Chiyoda-ku, Tokyo (JP)

( * ) Notice: Subject to any disclaimer, the term of this patent is extended or adjusted under 35 U.S.C. 154(b) by 0 days.

(21) Appl. No.: 15/554,054

(22) PCT Filed: Mar. 4, 2016

(86) PCT No.: PCT/JP2016/001210
§ 371 (c)(1),
(2) Date: Aug. 28, 2017

(87) PCT Pub. No.: WO2016/139959
PCT Pub. Date: Sep. 9, 2016

(65) Prior Publication Data
US 2018/0066120 A1    Mar. 8, 2018

(30) Foreign Application Priority Data
Mar. 5, 2015 (JP) ................. 2015-043146

(51) Int. Cl.
| | | |
|---|---|---|
| C08J 9/00 | (2006.01) | |
| C08L 27/06 | (2006.01) | |
| C08L 75/04 | (2006.01) | |
| B29C 41/18 | (2006.01) | |
| B32B 27/30 | (2006.01) | |
| B32B 27/40 | (2006.01) | |
| B32B 5/18 | (2006.01) | |
| C08L 83/04 | (2006.01) | |
| C08K 5/00 | (2006.01) | |

(52) U.S. Cl.
CPC ............. *C08J 9/0061* (2013.01); *B29C 41/18* (2013.01); *B32B 5/18* (2013.01); *B32B 27/30* (2013.01); *B32B 27/304* (2013.01); *B32B 27/40* (2013.01); *C08L 27/06* (2013.01); *C08L 75/04* (2013.01); *C08L 83/04* (2013.01); *C08F 2500/02* (2013.01); *C08K 5/0016* (2013.01); *C08L 2205/025* (2013.01); *C08L 2205/03* (2013.01)

(58) Field of Classification Search
CPC .. C08J 9/00; B29C 41/18; C08L 27/06; B32B 27/30; B32B 27/40; B32B 5/18
USPC ........................................................ 428/308.4
See application file for complete search history.

(56) References Cited

U.S. PATENT DOCUMENTS

| | | | |
|---|---|---|---|
| 4,675,356 A | 6/1987 | Miyata | |
| 2017/0233567 A1* | 8/2017 | Nishimura | B32B 5/18 428/424.6 |

FOREIGN PATENT DOCUMENTS

| | | |
|---|---|---|
| CN | 102977510 A | 3/2013 |
| EP | 3214127 A1 | 9/2017 |
| FR | 2730739 A1 | 8/1996 |
| JP | S61174270 A | 8/1986 |
| JP | H01301743 A | 12/1989 |
| JP | 05148397 * | 6/1993 |
| JP | H06279642 A | 10/1994 |
| JP | H08245800 A | 9/1996 |
| JP | H08291243 A | 11/1996 |
| JP | H08291244 A | 11/1996 |
| JP | 2000204212 A | 7/2000 |
| JP | 2001055477 A | 2/2001 |
| JP | 2005154670 A | 6/2005 |
| JP | 2011173974 A | 9/2011 |
| JP | 2012007026 A | 1/2012 |
| JP | 2014005449 A | 1/2014 |

OTHER PUBLICATIONS

Apr. 19, 2016, International Search Report issued in the International Patent Application No. PCT/JP2016/001210.
Sep. 5, 2017, International Preliminary Report on Patentability issued in the International Patent Application No. PCT/JP2016/001210.
Aug. 6, 2018, Extended European Search Report issued by the European Patent Office in the corresponding European Patent Application No. 16758655.1.

* cited by examiner

Primary Examiner — Deve E Valdez
(74) Attorney, Agent, or Firm — Kenja IP Law PC

(57) ABSTRACT

Provided is a vinyl chloride resin composition for powder molding that can provide a molded product having low fluff adhesiveness. The vinyl chloride resin composition for powder molding contains a vinyl chloride resin (a) and a silicone oil (b) having a viscosity of at least 10 cs and no greater than $200 \times 10^4$ cs. The content of the silicone oil (b) having a viscosity of at least 10 cs and no greater than $200 \times 10^4$ cs is at least 0.1 parts by mass and no greater than 10 parts by mass per 100 parts by mass of the vinyl chloride resin (a).

9 Claims, No Drawings

VINYL CHLORIDE RESIN COMPOSITION FOR POWDER MOLDING, VINYL CHLORIDE RESIN MOLDED PRODUCT, AND LAMINATE

TECHNICAL FIELD

The present disclosure relates to a vinyl chloride resin composition for powder molding that can provide a molded product having low fluff adhesiveness, a vinyl chloride resin molded product obtained through powder molding of the vinyl chloride resin composition for powder molding, and a laminate including the vinyl chloride resin molded product and a foamed polyurethane molded product.

BACKGROUND

An automobile instrument panel has a structure in which a foamed polyurethane layer is disposed between a substrate and a surface skin formed from a soft resin. Studies have been conducted in relation to a resin composition containing a vinyl chloride resin, which is one type of soft resin, and silicone oil (for example, refer to PTL 1). The resin composition described in PTL 1 has a soft texture, which makes a vinyl chloride resin molded product obtained through molding of this resin composition suitable for use as a surface skin of an automobile instrument panel. However, a vinyl chloride resin molded product may experience a problem of loss of softness due to a plasticizer contained in the material thereof migrating to the surface under the influence of heat, light, or the like. In order to resolve this problem, a resin composition for powder molding has been developed in which thermoplastic polyurethane is used instead of a vinyl chloride resin. In one specific example, a polyurethane resin composition for powder molding that contains powdered thermoplastic polyurethane and a hydroxy group-modified and/or (meth)acryloxy-modified silicone oil has been studied (for example, refer to PTL 2).

CITATION LIST

Patent Literature

PTL 1: JP 2000-204212 A
PTL 2: JP 2005-154670 A

SUMMARY

Technical Problem

When a cloth is used to wipe off dust, dirt, or the like adhered to an automobile instrument panel in which a molded product obtained through powder molding of a soft resin composition is used as a surface skin, fibrous waste included in the wiped off dust, dirt, or the like may adhere to the surface skin, causing a problem of poor external appearance of the automobile instrument panel. Accordingly, in recent years, there has been demand for an automobile instrument panel that exhibits a low tendency for fibrous waste to adhere thereto (low fluff adhesiveness) even when the surface of the automobile instrument panel is wiped using a cloth. However, an automobile instrument panel having a surface skin that meets this demand has not yet been achieved.

The present disclosure aims to solve a problem of provision of a vinyl chloride resin composition for powder molding that can provide a molded product having low fluff adhesiveness.

Solution to Problem

As a result of diligent investigation aimed at solving the problem set forth above, the inventor discovered that the problem can be solved through a vinyl chloride resin composition for powder molding in which a specific amount of a silicone oil having a specific viscosity is compounded with a vinyl chloride resin. This discovery led to the present disclosure.

A presently disclosed vinyl chloride resin composition for powder molding contains: a vinyl chloride resin (a); and a silicone oil (b) having a viscosity of at least 10 cs and no greater than $200 \times 10^4$ cs, wherein content of the silicone oil (b) having a viscosity of at least 10 cs and no greater than $200 \times 10^4$ cs is at least 0.1 parts by mass and no greater than 10 parts by mass per 100 parts by mass of the vinyl chloride resin (a).

The "viscosity" referred to herein can be measured in accordance with ASTM D 445-46T using an Ubbelohde viscometer.

In the presently disclosed vinyl chloride resin composition for powder molding, the vinyl chloride resin (a) preferably includes vinyl chloride resin particles (a1) having an average degree of polymerization of at least 800 and no greater than 5,000, and vinyl chloride resin fine particles (a2) having an average degree of polymerization of at least 500 and no greater than 5,000, the vinyl chloride resin particles (a1) having an average degree of polymerization of at least 800 and no greater than 5,000 preferably have a percentage content in the vinyl chloride resin (a) of at least 70 mass % and no greater than 100 mass %, and the vinyl chloride resin fine particles (a2) having an average degree of polymerization of at least 500 and no greater than 5,000 preferably have a percentage content in the vinyl chloride resin (a) of at least 0 mass % and no greater than 30 mass %.

Herein, the term "resin particles" is used to refer to particles having a particle diameter of at least 30 μm and the term "resin fine particles" is used to refer to particles having a particle diameter of less than 30 μm.

The average degrees of polymerization of vinyl chloride resins forming the vinyl chloride resin particles and the vinyl chloride resin fine particles (hereinafter, also referred to as "vinyl chloride resin (fine) particles") are measured in accordance with JIS K 6720-2.

The presently disclosed vinyl chloride resin composition for powder molding preferably further contains a plasticizer, and content of the plasticizer is preferably at least 90 parts by mass per 100 parts by mass of the vinyl chloride resin (a).

The presently disclosed vinyl chloride resin composition for powder molding is preferably used for powder slush molding.

Moreover, a presently disclosed vinyl chloride resin molded product is obtained through powder molding of any one of the vinyl chloride resin compositions for powder molding described above.

The presently disclosed vinyl chloride resin molded product is preferably obtained through powder slush molding of the vinyl chloride resin composition for powder molding.

Moreover, the presently disclosed vinyl chloride resin molded product is preferably for a surface skin of an automobile instrument panel.

A presently disclosed laminate includes a foamed polyurethane molded product and any one of the vinyl chloride resin molded products described above.

The presently disclosed laminate is preferably for an automobile instrument panel.

Advantageous Effect

The presently disclosed vinyl chloride resin molded product obtained through powder molding of the presently disclosed vinyl chloride resin composition for powder molding has low fluff adhesiveness.

DETAILED DESCRIPTION (Vinyl Chloride Resin Composition for Powder Molding)

The presently disclosed vinyl chloride resin composition for powder molding contains a vinyl chloride resin (a) and a silicone oil (b) having a viscosity of at least 10 cs and no greater than $200 \times 10^4$ cs, and may optionally further contain additives. In the presently disclosed vinyl chloride resin composition for powder molding, the content of the silicone oil (b) having a viscosity of at least 10 cs and no greater than $200 \times 10^4$ cs is at least 0.1 parts by mass and no greater than 10 parts by mass per 100 parts by mass of the vinyl chloride resin (a).

<Vinyl Chloride Resin (a)>

The vinyl chloride resin (a) is a polymer that includes units derived from vinyl chloride used as a monomer. The vinyl chloride resin (a) preferably includes vinyl chloride resin particles (a1) having a specific degree of polymerization and/or vinyl chloride resin fine particles (a2) having a specific degree of polymerization, but is not specifically limited thereto. The vinyl chloride resin (a) is more preferably composed of the vinyl chloride resin particles (a1) and the vinyl chloride resin fine particles (a2) in specific percentage contents.

Note that the phrases "vinyl chloride resin particles (a1) having an average degree of polymerization of at least 800 and no greater than 5,000", "vinyl chloride resin particles (a1) having a specific degree of polymerization", and "vinyl chloride resin particles (a1)" are all used with the same meaning herein. Also note that the phrases "vinyl chloride resin fine particles (a2) having an average degree of polymerization of at least 500 and no greater than 5,000", "vinyl chloride resin fine particles (a2) having a specific degree of polymerization", and "vinyl chloride resin fine particles (a2)" are all used with the same meaning herein.

Moreover, in a situation in which, for example, the vinyl chloride resin (a) is composed of the vinyl chloride resin particles (a1) and the vinyl chloride resin fine particles (a2), the mass of the vinyl chloride resin (a) indicates the combined mass of the vinyl chloride resin particles (a1) and the vinyl chloride resin fine particles (a2).

Examples of vinyl chloride resins that may form the vinyl chloride resin particles (a1) and the vinyl chloride resin fine particles (a2) include homopolymers of vinyl chloride and copolymers including vinyl chloride units in a proportion of preferably at least 50 mass %, and more preferably at least 70 mass %.

Specific examples of monomers (comonomers) that are copolymerizable with vinyl chloride and can be used in a vinyl chloride copolymer include olefins such as ethylene and propylene; halogenated olefins such as allyl chloride, vinylidene chloride, vinyl fluoride, and trifluorochloroethylene; carboxylic acid vinyl esters such as vinyl acetate and vinyl propionate; vinyl ethers such as isobutyl vinyl ether and cetyl vinyl ether; allyl ethers such as allyl-3-chloro-2-oxypropyl ether and allyl glycidyl ether; unsaturated carboxylic acids, esters of unsaturated carboxylic acids, and acid anhydrides of unsaturated carboxylic acids such as acrylic acid, maleic acid, itaconic acid, acrylic acid-2-hydroxyethyl, methyl methacrylate, monomethyl maleate, diethyl maleate, and maleic anhydride; unsaturated nitriles such as acrylonitrile and methacrylonitrile; acrylamides such as acrylamide, N-methylolacrylamide, acrylamido-2-methylpropane sulfonic acid, and (meth)acrylamidopropyl-trimethylammonium chloride; and allyl amines and derivatives thereof such as allylamine benzoate and diallyldimethylammonium chloride. The above examples of monomers are merely some of the comonomers that can be used. Further examples of comonomers that can be used include various monomers provided in pages 75 to 104 of "Polyvinyl chloride" edited by the Vinyl Section of the Kinki Chemical Society Japan and published by Nikkan Kogyo Shimbun, Ltd. (1988). Any one of these monomers or any two or more of these monomers may be used. Examples of vinyl chloride resins that may form the vinyl chloride resin particles (a1) also include resins formed by graft polymerization of (1) vinyl chloride or (2) vinyl chloride and a comonomer such as described above with a resin such as an ethylene-vinyl acetate copolymer, an ethylene-methyl methacrylate copolymer, an ethylene-ethyl acrylate copolymer, or a chlorinated polyethylene.

In the present specification, the term "(meth)acryl" is used to indicate "acryl" and/or "methacryl".

Conventionally known production methods such as suspension polymerization, emulsion polymerization, solution polymerization, and bulk polymerization can be used to produce the vinyl chloride resin (a).

<<Vinyl Chloride Resin Particles (a1)>>

The vinyl chloride resin (a) preferably includes vinyl chloride resin particles (a1) having a specific degree of polymerization.

In the vinyl chloride resin composition for powder molding, the vinyl chloride resin particles (a1) normally function as a matrix resin.

The vinyl chloride resin forming the vinyl chloride resin particles (a1) is particularly preferably a vinyl chloride resin produced by suspension polymerization.

The average degree of polymerization of the vinyl chloride resin particles (a1) is preferably at least 800, more preferably at least 1,200, even more preferably at least 1,600, and particularly preferably at least 1,900, and is preferably no greater than 5,000, and more preferably no greater than 3,000. As a result of the average degree of polymerization of the vinyl chloride resin particles (a1) being within any of the ranges set forth above, a vinyl chloride resin molded product obtained through powder molding of the vinyl chloride resin composition for powder molding can be provided with good heat aging resistance and lower fluff adhesiveness.

One type of vinyl chloride resin particles (a1) may be used, or two or more types of vinyl chloride resin particles (a1) having different average degrees of polymerization may be used.

The average particle diameter of the vinyl chloride resin particles (a1) is normally at least 30 μm, preferably at least 50 μm, and more preferably at least 100 μm, and is preferably no greater than 500 μm, more preferably no greater than 250 μm, and even more preferably no greater than 200 μm. As a result of the average particle diameter of the vinyl chloride resin particles (a1) being within any of the ranges set forth above, powder fluidity of the vinyl chloride resin composition for powder molding is improved and smoothness of a vinyl chloride resin molded product obtained through powder molding of the vinyl chloride resin composition for powder molding is improved. Moreover, the vinyl chloride resin molded product can be provided with lower fluff adhesiveness.

The "particle diameter" and "average particle diameter" of the vinyl chloride resin particles (a1) can be measured in accordance with JIS Z8825 by a laser diffraction method.

The percentage content of the vinyl chloride resin particles (a1) in 100 mass % of the vinyl chloride resin (a) is preferably at least 60 mass %, more preferably at least 70 mass %, even more preferably at least 75 mass %, and may be 100 mass %, but is preferably no greater than 95 mass %, more preferably no greater than 90 mass %, and even more preferably no greater than 85 mass %. As a result of the percentage content of the vinyl chloride resin particles (a1) being at least any of the lower limits set forth above, a vinyl chloride resin molded product produced using the vinyl chloride resin composition for powder molding can be provided with better heat aging resistance. Moreover, as a result of the percentage content of the vinyl chloride resin particles (a1) being no greater than any of the upper limits set forth above, powder fluidity of the vinyl chloride resin composition for powder molding becomes more favorable.

<<Vinyl Chloride Resin Fine Particles (a2)>>

The vinyl chloride resin (a) may contain vinyl chloride resin fine particles (a2) having a specific degree of polymerization as necessary. In the vinyl chloride resin composition for powder molding, the vinyl chloride resin fine particles (a2) function as a dusting agent (powder fluidity modifier) for improving powder fluidity of the vinyl chloride resin composition.

The vinyl chloride resin forming the vinyl chloride resin fine particles (a2) is particularly preferably a vinyl chloride resin produced by emulsion polymerization.

The average degree of polymerization of the vinyl chloride resin forming the vinyl chloride resin fine particles (a2) is preferably at least 500, more preferably at least 600, and even more preferably at least 700, and is preferably no greater than 5,000, more preferably no greater than 3,000, even more preferably no greater than 2,500, and further preferably no greater than 2,300. As a result of the average degree of polymerization of the vinyl chloride resin forming the vinyl chloride resin fine particles (a2) being within any of the ranges set forth above, the vinyl chloride resin composition for powder molding can be provided with good powder fluidity and a vinyl chloride resin molded product can be provided with good heat aging resistance.

One type of vinyl chloride resin fine particles (a2) may be used, or two or more types of vinyl chloride resin fine particles (a2) having different average degrees of polymerization may be used. However, from a viewpoint of further raising powder fluidity of the vinyl chloride resin composition for powder molding, it is preferable that two different types of vinyl chloride resin fine particles (a2) are used together.

The average particle diameter of the vinyl chloride resin fine particles (a2) is normally less than 30 μm, and preferably no greater than 10 μm, and is preferably at least 0.1 μm. As a result of the average particle diameter of the vinyl chloride resin fine particles (a2) being within any of the ranges set forth above, powder fluidity of the vinyl chloride resin composition for powder molding is improved.

The "particle diameter" and "average particle diameter" of the vinyl chloride resin fine particles (a2) can be measured in accordance with JIS Z8825 by a laser diffraction method.

The percentage content of the vinyl chloride resin fine particles (a2) in 100 mass % of the vinyl chloride resin (a) is at least 0 mass %, preferably at least 1 mass %, more preferably at least 5 mass %, and even more preferably at least 8 mass %, and is preferably no greater than 30 mass %, more preferably no greater than 25 mass %, and even more preferably no greater than 20 mass %. As a result of the percentage content of the vinyl chloride resin fine particles (a2) being within any of the ranges set forth above, the vinyl chloride resin composition for powder molding can be provided with good powder fluidity and a vinyl chloride resin molded product can be provided with good heat aging resistance.

<Silicone Oil (b)>

The presently disclosed vinyl chloride resin composition for powder molding contains a silicone oil (b) having a viscosity of at least 10 cs and no greater than $200\times10^4$ cs (herein, also referred to simply as "silicone oil (b)" or "silicone oil (b) having a specific viscosity"). The silicone oil (b) may be a polar group-unmodified silicone oil or a polar group-modified silicone oil. The polar group-unmodified silicone oil is a polymer having a polysiloxane structure. Specific examples of polar group-unmodified silicone oils that can be used include polydimethylsiloxane, polydiethylsiloxane, poly(methyl ethyl) siloxane, and mixtures of any of the preceding examples. Examples of polar group-modified silicone oils that can be used include silicone oils in which a polar group such as a carboxyl group, a hydroxy group, a mercapto group, an amino group, an epoxy group, or a (meth)acryloyloxy group has been introduced into a polymer having a polysiloxane structure. The moiety at which the polar group is introduced is an end and/or a side chain of the polymer having a polysiloxane structure. Of these examples, a polar group-unmodified silicone oil is preferable as the silicone oil (b), and polydimethylsiloxane is more preferable as the silicone oil (b).

In the present specification, the term "(meth)acryloyloxy group" is used to indicate an "acryloyloxy group" and/or a "methacryloyloxy group".

The viscosity of the silicone oil (b) is required to be at least 10 cs and no greater than $200\times10^4$ cs. Moreover, the viscosity of the silicone oil (b) is preferably at least 50 cs, more preferably at least 1,000 cs, and even more preferably at least 5,000 cs, and is preferably no greater than $150\times10^4$ cs, and more preferably no greater than $100\times10^4$ cs. As a result of the viscosity of the silicone oil (b) being within any of the ranges set forth above, mold release properties of a vinyl chloride resin molded product obtained through powder molding of the vinyl chloride resin composition for powder molding can be improved, and fluff adhesiveness of the vinyl chloride resin molded product can be reduced.

The content of the silicone oil (b) per 100 parts by mass of the vinyl chloride resin (a) is required to be at least 0.1 parts by mass and no greater than 10 parts by mass, is preferably at least 0.2 parts by mass, more preferably at least 0.4 parts by mass, even more preferably at least 1 part by mass, and particularly preferably at least 2 parts by mass, and is preferably no greater than 8 parts by mass, more preferably no greater than 6 parts by mass, even more preferably no greater than 5 parts by mass, and particularly preferably no greater than 4 parts by mass. As a result of the content of the silicone oil (b) being within any of the ranges set forth above, mold release properties of a vinyl chloride resin molded product obtained through powder molding of the vinyl chloride resin composition for powder molding can be improved, and fluff adhesiveness of the vinyl chloride resin molded product can be reduced.

In a situation in which the vinyl chloride resin composition for powder molding contains a subsequently described plasticizer, the content of the silicone oil (b) per 100 parts by mass of the plasticizer is preferably at least 0.20 parts by mass, more preferably at least 0.30 parts by mass, and even more preferably at least 0.50 parts by mass, and is preferably no greater than 3.0 parts by mass, more preferably no greater than 2.5 parts by mass, and even more preferably no greater than 2.0 parts by mass. As a result of the content of the silicone oil (b) being at least any of the lower limits set forth above, mold release properties of a vinyl chloride resin molded product obtained through powder molding of the vinyl chloride resin composition for powder molding can be further improved, and fluff adhesiveness of the vinyl chloride resin molded product can be further reduced. Moreover, as a result of the content of the silicone oil (b) being no greater than any of the upper limits set forth above, good mold release properties and fluff adhesiveness can be achieved while suppressing stickiness of the vinyl chloride resin molded product because the silicone oil (b) is not contained in an excessive amount.

<Additives>

The vinyl chloride resin composition for powder molding may further contain additives in addition to the vinyl chloride resin (a) and the silicone oil (b) having a viscosity of at least 10 cs and no greater than $200 \times 10^4$ cs. Examples of these additives include, but are not specifically limited to, plasticizers, perchloric acid-treated hydrotalcite, zeolites, β-diketones, fatty acid metal salts, dusting agents other than the vinyl chloride resin fine particles (a2), and other additives.

<<Plasticizer>>

The presently disclosed vinyl chloride resin composition for powder molding preferably further contains a plasticizer. Specific examples of plasticizers that can be used include the following primary plasticizers and secondary plasticizers.

Examples of so-called primary plasticizers include:

trimellitic acid esters such as tri-n-hexyl trimellitate, tri-n-heptyl trimellitate, tri-n-octyl trimellitate, tri(2-ethylhexyl) trimellitate, tri-n-nonyl trimellitate, tri-n-decyl trimellitate, triisodecyl trimellitate, tri-n-undecyl trimellitate, tri-n-dodecyl trimellitate, tri-n-alkyl trimellitates (esters including two or more types of alkyl groups having differing carbon numbers of 6 to 12 in molecules thereof), and trialkyl trimellitates (esters including two or more types of alkyl groups having differing carbon numbers of 8 to 10 in molecules thereof);

pyromellitic acid esters such as tetra-n-hexyl pyromellitate, tetra-n-heptyl pyromellitate, tetra-n-octyl pyromellitate, tetra(2-ethylhexyl) pyromellitate, tetra-n-nonyl pyromellitate, tetra-n-decyl pyromellitate, tetraisodecyl pyromellitate, tetra-n-undecyl pyromellitate, tetra-n-dodecyl pyromellitate, and tetra-n-alkyl pyromellitates (esters including two or more types of alkyl groups having differing carbon numbers of 6 to 12 in molecules thereof);

phthalic acid derivatives such as dimethyl phthalate, diethyl phthalate, dibutyl phthalate, di(2-ethylhexyl) phthalate, di-n-octyl phthalate, diisobutyl phthalate, diheptyl phthalate, diphenyl phthalate, diisodecyl phthalate, ditridecyl phthalate, diundecyl phthalate, dibenzyl phthalate, butyl benzyl phthalate, dinonyl phthalate, and dicyclohexyl phthalate;

isophthalic acid derivatives such as dimethyl isophthalate, di(2-ethylhexyl) isophthalate, and diisooctyl isophthalate;

tetrahydrophthalic acid derivatives such as di(2-ethylhexyl) tetrahydrophthalate, di-n-octyl tetrahydrophthalate, and diisodecyl tetrahydrophthalate;

adipic acid derivatives such as di-n-butyl adipate, di(2-ethylhexyl) adipate, diisodecyl adipate, and diisononyl adipate;

azelaic acid derivatives such as di(2-ethylhexyl) azelate, diisooctyl azelate, and di-n-hexyl azelate;

sebacic acid derivatives such as di-n-butyl sebacate, di(2-ethylhexyl) sebacate, diisodecyl sebacate, and di(2-butyloctyl) sebacate;

maleic acid derivatives such as di-n-butyl maleate, dimethyl maleate, diethyl maleate, and di(2-ethylhexyl) maleate;

fumaric acid derivatives such as di-n-butyl fumarate and di(2-ethylhexyl) fumarate;

citric acid derivatives such as tri ethyl citrate, tri-n-butyl citrate, acetyl triethyl citrate, and acetyl tri(2-ethylhexyl) citrate;

itaconic acid derivatives such as monomethyl itaconate, monobutyl itaconate, dimethyl itaconate, diethyl itaconate, dibutyl itaconate, and di(2-ethylhexyl) itaconate;

oleic acid derivatives such as butyl oleate, glyceryl monooleate, and diethylene glycol monooleate;

ricinoleic acid derivatives such as methylacetyl ricinoleate, butylacetyl ricinoleate, glyceryl monoricinoleate, and diethylene glycol monoricinoleate;

stearic acid derivatives such as n-butyl stearate and diethylene glycol distearate;

other fatty acid derivatives such as diethylene glycol monolaurate, diethylene glycol dipelargonate, and pentaerythritol fatty acid esters;

phosphoric acid derivatives such as triethyl phosphate, tributyl phosphate, tri(2-ethylhexyl) phosphate, tributoxyethyl phosphate, triphenyl phosphate, cresyl diphenyl phosphate, tricresyl phosphate, trixylenyl phosphate, and tris (chloroethyl) phosphate;

glycol derivatives such as diethylene glycol dibenzoate, dipropylene glycol dibenzoate, triethylene glycol dibenzoate, triethylene glycol di(2-ethylbutyrate), triethylene glycol di(2-ethylhexanoate), and dibutyl methylenebisthioglycolate;

glycerin derivatives such as glycerol monoacetate, glycerol triacetate, and glycerol tributyrate;

epoxy derivatives such as epoxy hexahydro diisodecyl phthalate, epoxy triglyceride, epoxidized octyl oleate, and epoxidized decyl oleate; and polyester plasticizers such as adipic acid polyesters, sebacic acid polyesters, and phthalic acid polyesters.

One of such primary plasticizers or two or more of such primary plasticizers may be used. Of these primary plasticizers, tri-n-alkyl trimellitates (esters including two or more types of alkyl groups having differing carbon numbers of 6 to 12 in molecules thereof) are preferable.

Examples of so-called secondary plasticizers include epoxidized vegetable oils such as epoxidized soybean oil and epoxidized linseed oil; chlorinated paraffin; fatty acid esters of glycol such as triethylene glycol dicaprylate; phenyl oleate; and methyl dihydroabietate. One of such secondary plasticizers or two or more of such secondary plasticizers may be used in combination with a primary plasticizer. Of these secondary plasticizers, epoxidized vegetable oils are preferable, and epoxidized soybean oil is more preferable. In a situation in which a secondary plasticizer is used, a primary plasticizer of equivalent or greater mass is preferably used in combination with the secondary plasticizer.

The content of the plasticizer per 100 parts by mass of the vinyl chloride resin (a) is preferably at least 30 parts by mass, more preferably at least 60 parts by mass, and even more preferably at least 90 parts by mass, and is preferably no greater than 190 parts by mass, more preferably no greater than 170 parts by mass, and even more preferably no greater than 160 parts by mass. As a result of the content of the plasticizer being within any of the ranges set forth above, fluff adhesiveness of a vinyl chloride resin molded product obtained through powder molding of the vinyl chloride resin composition for powder molding can be reduced. The plasticizer is favorably absorbed by the vinyl chloride resin (a) to improve powder molding properties of the vinyl chloride resin composition for powder molding. Note that an increase in the amount of plasticizer typically leads to an increase in fluff adhesiveness. However, as a result of the presently disclosed vinyl chloride resin composition for powder molding containing a specific silicone oil, fluff adhesiveness can be adequately reduced even when the amount of plasticizer is large compared to that conventionally used as mentioned above.

<<Perchloric Acid-Treated Hydrotalcite>>

The presently disclosed vinyl chloride resin composition for powder molding may contain perchloric acid-treated hydrotalcite. The perchloric acid-treated hydrotalcite can be easily produced by, for example, addition and stirring of hydrotalcite with a dilute aqueous solution of perchloric acid, followed by filtration, dehydration, or drying as necessary. Through this process, at least some of the carbonate anions ($CO_3^{2-}$) in the hydrotalcite are substituted with perchlorate anions ($ClO_4^-$) (note that 2 mol of perchlorate anions are substituted per 1 mol of carbonate anions). The molar ratio of hydrotalcite and perchloric acid may be freely set, although a ratio of at least 0.1 mol and no greater than 2 mol of perchloric acid per 1 mol of hydrotalcite is typical.

The substitution ratio of carbonate anions in the untreated (unsubstituted) hydrotalcite by perchlorate anions is preferably at least 50 mol %, more preferably at least 70 mol %, and even more preferably at least 85 mol %. Moreover, the substitution ratio of carbonate anions in the untreated (unsubstituted) hydrotalcite by perchlorate anions is preferably no greater than 95 mol %. As a result of the substitution ratio of carbonate anions in the untreated (unsubstituted) hydrotalcite by perchlorate anions being within any of the ranges set forth above, a vinyl chloride resin molded product obtained through powder molding of the vinyl chloride resin composition for powder molding can be provided with good flexibility at low temperatures and fluff adhesiveness of the vinyl chloride resin molded product can be further reduced.

Hydrotalcite is a non-stoichiometric compound represented by a general formula: $[Mg_{1-x}Al_x(OH)_z]^{x+}[(CO_3)_{x/2}.mH_2O]^{x-}$, and is an inorganic substance having a layered crystal structure formed by a positively charged basic layer of $[Mg_{1-x}Al_x(OH)_2]^{x+}$ and a negatively charged intermediate layer of $[(CO_3)_{x/2}.mH_2O]^{x-}$. In the general formula shown above, x represents a number that is greater than 0 and no greater than 0.33. Natural hydrotalcite is represented by $Mg_6Al_2(OH)_{16}CO_3.4H_2O$. On the other hand, a synthetic hydrotalcite represented by $Mg_{4.5}Al_2(OH)_{13}CO_3.3.5H_2O$ is commercially available. Synthetic hydrotalcite can, for example, be synthesized by a method described in JP S61-174270 A.

The content of the perchloric acid-treated hydrotalcite per 100 parts by mass of the vinyl chloride resin (a) is preferably at least 0.5 parts by mass, more preferably at least 1 part by mass, and even more preferably at least 1.5 parts by mass, and is preferably no greater than 7 parts by mass, more preferably no greater than 6 parts by mass, and even more preferably no greater than 5.5 parts by mass. As a result of the content of the perchloric acid-treated hydrotalcite being within any of the ranges set forth above, a vinyl chloride resin molded product obtained through powder molding of the vinyl chloride resin composition for powder molding can be provided with good flexibility at low temperatures, and fluff adhesiveness of the vinyl chloride resin molded product can be further reduced.

<<Zeolite>>

The presently disclosed vinyl chloride resin composition for powder molding may include a zeolite as a stabilizer. A zeolite is represented by a general formula: $M_{x/n}.[(AlO_2)_x.(SiO_2)_3].zH_2O$ (in the general formula, M is a metal ion of valency n, x+y is the number of tetrahedra per unit cell, and z is the number of moles of water). Examples of M in the general formula include monovalent and divalent metals such as Na, Li, Ca, Mg, and Zn, and mixtures thereof.

The content of the zeolite is not limited to a specific range. However, the content of the zeolite per 100 parts by mass of the vinyl chloride resin (a) is preferably at least 0.1 parts by mass, and is preferably no greater than 5 parts by mass. As a result of the content of the zeolite being within the range set forth above, a vinyl chloride resin molded product obtained through powder molding of the vinyl chloride resin composition for powder molding can be provided with good flexibility at low temperatures, and fluff adhesiveness of the vinyl chloride resin molded product can be further reduced.

<<β-Diketone>>

A β-diketone can be used to more effectively suppress variation of initial color of a vinyl chloride resin molded product obtained through powder molding of the presently disclosed vinyl chloride resin composition for powder molding. Specific examples of β-diketones include dibenzoylmethane, stearoylbenzoylmethane, and palmitoylbenzoylmethane. One of such β-diketones may be used, or two or more of such β-diketones may be used in combination.

The content of the β-diketone is not limited to a specific range. However, the content of the β-diketone per 100 parts by mass of the vinyl chloride resin (a) is preferably at least 0.1 parts by mass, and is preferably no greater than 5 parts by mass.

<<Fatty Acid Metal Salt>>

The presently disclosed vinyl chloride resin composition for powder molding may contain a fatty acid metal salt. The fatty acid metal salt is preferably a metal salt of a monobasic fatty acid, more preferably a metal salt of a monobasic fatty acid having a carbon number of at least 12 and no greater than 24, and even more preferably a metal salt of a monobasic fatty acid having a carbon number of at least 15 and no greater than 21. Specific examples of the fatty acid metal salt include lithium stearate, magnesium stearate, aluminum stearate, calcium stearate, strontium stearate, barium stearate, zinc stearate, calcium laurate, barium laurate, zinc laurate, barium 2-ethylhexanoate, zinc 2-ethylhexanoate, barium ricinoleate, and zinc ricinoleate. The metal in the fatty acid metal salt is preferably a metal that can produce polyvalent cations, more preferably a metal that can produce divalent cations, further preferably a metal from periods 3 to 6 of the periodic table that can produce divalent cations, and particularly preferably a metal from period 4 of the periodic table that can produce divalent cations. The fatty acid metal salt is most preferably zinc stearate.

The content of the fatty acid metal salt per 100 parts by mass of the vinyl chloride resin (a) is preferably at least 0.05 parts by mass, and more preferably at least 0.1 part by mass, and is preferably no greater than 5 parts by mass, more preferably no greater than 1 part by mass, and even more preferably no greater than 0.5 parts by mass. As a result of the content of the fatty acid metal salt being within any of the ranges set forth above, a vinyl chloride resin molded product obtained through powder molding of the vinyl chloride resin composition for powder molding can be provided with good flexibility at low temperatures, fluff adhesiveness of the vinyl chloride resin molded product can be further reduced, and discoloration of the vinyl chloride resin molded product after a heat resistance test can be reduced.

<<Other Dusting Agents>>

The presently disclosed vinyl chloride resin composition for powder molding may further contain dusting agents other than the vinyl chloride resin fine particles (a2) (hereinafter, also referred to as "other dusting agents"). Specific examples of other dusting agents that can be used include inorganic fine particles such as calcium carbonate, talc, and aluminum oxide; and organic fine particles such as polyacrylonitrile resin fine particles, poly(meth)acrylate resin fine particles, polystyrene resin fine particles, polyethylene resin fine particles, polypropylene resin fine particles, polyester resin fine particles, and polyamide resin fine particles. Among these examples, inorganic fine particles having an average particle diameter of at least 10 nm and no greater than 100 nm are preferable.

The content of other dusting agents is not limited to a specific range. The content of other dusting agents per 100 parts by mass of the vinyl chloride resin (a) is preferably no greater than 20 parts by mass, more preferably no greater than 10 parts by mass, and may be 0 parts by mass.

<<Other Additives>>

The presently disclosed vinyl chloride resin composition for powder molding may contain other additives such as colorants, impact modifiers, perchloric acid compounds other than perchloric acid-treated hydrotalcite (for example, sodium perchlorate and potassium perchlorate), antioxidants, fungicides, flame retardants, antistatic agents, fillers, light stabilizers, and foaming agents.

Specific examples of colorants include quinacridone-based pigments, perylene-based pigments, condensed polyazo pigments, isoindolinone-based pigments, copper phthalocyanine-based pigments, titanium white, and carbon black. Any one of these pigments or any two or more of these pigments may be used. A quinacridone-based pigment is obtained through concentrated sulfuric acid treatment of a p-phenylene dianthranilic acid and has a hue from yellowish red to reddish purple. Specific examples of quinacridone-based pigments include quinacridone red, quinacridone magenta, and quinacridone violet.

A perylene pigment-based is obtained through a condensation reaction of perylene-3,4,9,10-tetracarboxylic anhydride and an aromatic primary amine and has a hue from red to red-purple/brown. Specific examples of perylene-based pigments include perylene red, perylene orange, perylene maroon, perylene vermilion, and perylene bordeaux.

A condensed polyazo pigment is obtained through condensation of an azo pigment in a solvent to achieve a high molecular weight and has a hue of a yellow or red pigment. Specific examples of condensed polyazo pigments include polyazo red, polyazo yellow, chromophthal orange, chromophthal red, and chromophthal scarlet.

An isoindolinone-based pigment is obtained through a condensation reaction of 4,5,6,7-tetrachloroisoindolinone and an aromatic primary diamine and has a hue from greenish yellow to red/brown. A specific example of an isoindolinone-based pigment is isoindolinone yellow.

A copper phthalocyanine-based pigment is a pigment in which copper is coordinated with a phthalocyanine and has a hue from yellowish green to bright blue. Specific examples of copper phthalocyanine-based pigments include phthalocyanine green and phthalocyanine blue.

Titanium white is a white pigment made from titanium dioxide. Titanium white has high opacity and exists in anatase form and rutile form.

Carbon black is a black pigment having carbon as a main component and also including oxygen, hydrogen, and nitrogen. Specific examples of carbon black include thermal black, acetylene black, channel black, furnace black, lamp black, and bone black.

Specific examples of impact modifiers include an acrylonitrile-butadiene-styrene copolymer, a methyl methacrylate-butadiene-styrene copolymer, a chlorinated polyethylene, an ethylene-vinyl acetate copolymer, and a chlorosulfonated polyethylene. One impact modifier or two or more impact modifiers may be used in the presently disclosed vinyl chloride resin composition for powder molding. Note that the impact modifier is dispersed as a heterogeneous phase of fine elastic particles in the vinyl chloride resin composition for powder molding. In the presently disclosed vinyl chloride resin composition for powder molding, polar groups and chains graft polymerized with the elastic particles are compatible with the vinyl chloride resin (a) and improve impact resistance of the vinyl chloride resin composition.

Specific examples of antioxidants include phenolic antioxidants, sulfuric antioxidants, and phosphoric antioxidants.

Specific examples of fungicides include aliphatic ester-based fungicides, hydrocarbon-based fungicides, organic nitrogen-based fungicides, and organic nitrogen sulfur-based fungicides.

Specific examples of flame retardants include halogen-containing flame retardants such as chlorinated paraffin; phosphoric flame retardants such as phosphoric acid esters; and inorganic hydroxides such as magnesium hydroxide and aluminum hydroxide.

Specific examples of antistatic agents include anionic antistatic agents such as fatty acid salts, higher alcohol sulfuric acid esters, and sulfonic acid salts; cationic antistatic agents such as aliphatic amine salts and quaternary ammonium salts; and non-ionic antistatic agents such as polyoxyethylene alkyl ethers and polyoxyethylene alkyl phenol ethers.

Specific examples of fillers include silica, talc, mica, calcium carbonate, and clay.

Specific examples of light stabilizers include ultraviolet absorbers based on benzotriazole, benzophenone, and nickel chelate, and hindered amine light stabilizers.

Specific examples of foaming agents include organic foaming agents such as azo compounds (for example, azodicarbonamides and azobisisobutyronitrile), nitroso compounds (for example, N,N'-dinitrosopentamethylenetetramine), and sulfonyl hydrazide compounds (for example p-toluenesulfonyl hydrazide and p,p-oxybis(benzenesulfonyl hydrazide)); chlorofluorocarbons, carbon dioxide gas, water, and volatile hydrocarbon compounds (for example, pentane); and gaseous foaming agents such as microcapsules containing any of the preceding examples.

<Production of Vinyl Chloride Resin Composition for Powder Molding>

No limitations are placed on the mixing method of the vinyl chloride resin (a), the silicone oil (b), and additives added as necessary. In one example of a preferable mixing method, components other than a dusting agent (inclusive of the vinyl chloride resin fine particles (a2) and other dusting agents added as necessary) are initially mixed by dry blending, and then the dusting agent is added and mixed there-with. The dry blending is preferably carried out using a Henschel mixer. The temperature during dry blending is preferably at least 50° C., and more preferably at least 70° C., and is preferably no higher than 100° C., and more preferably no higher than 80° C.

(Vinyl Chloride Resin Molded Product)

The presently disclosed vinyl chloride resin molded product is obtained through powder molding, and preferably through powder slush molding, of the presently disclosed vinyl chloride resin composition for powder molding. The presently disclosed vinyl chloride resin molded product is suitable for use as a surface skin of an automobile interior material such as an automobile instrument panel or a door trim.

<Production of Vinyl Chloride Resin Molded Product>

The mold temperature during powder slush molding is preferably at least 200° C., and more preferably at least 220° C., and is preferably no higher than 300° C., and more preferably no higher than 280° C.

The presently disclosed vinyl chloride resin molded product may, for example, be suitably obtained by the following method. In this method, the vinyl chloride resin composition for powder molding is sprinkled onto a mold having a temperature within any of the ranges set forth above. The vinyl chloride resin composition is initially left for at least 5 seconds and no greater than 30 seconds and, after shaking off any excess vinyl chloride resin composition, is then further left for at least 30 seconds and no greater than 3 minutes. The mold is subsequently cooled to a temperature of at least 10° C. and no higher than 60° C. and the resultant vinyl chloride resin molded product is removed from the mold.

(Laminate)

The presently disclosed laminate can be obtained by stacking the vinyl chloride resin molded product described above with a foamed polyurethane molded product. Examples of stacking methods that can be adopted include: (1) a method in which the vinyl chloride resin molded product and the foamed polyurethane molded product are produced separately and are subsequently joined together by, for example, thermal fusion bonding, thermal adhesion, or using a commonly known adhesive; and (2) a method in which raw materials of the foamed polyurethane molded product such as an isocyanate and a polyol are caused to react and polymerize on the vinyl chloride resin molded product while carrying out polyurethane foaming by a commonly known method to directly form the foamed polyurethane molded product on the vinyl chloride resin molded product. The latter method (2) is more suitable because it involves a simple process and enables laminates of various different shapes to be obtained while ensuring reliable adhesion of the vinyl chloride resin molded product and the foamed polyurethane molded product.

The presently disclosed laminate is suitable for use as an automobile interior material such as an automobile instrument panel or a door trim.

EXAMPLES

The present disclosure is described in more detail through the following examples but is not limited to these examples. Various properties were measured by the following methods.

<Viscosity of Silicone Oil>

The viscosity of silicone oil was determined by measuring the kinematic viscosity $\eta^{CS/25}$ (units: mm²/s=cs) at a temperature of 25° C. in accordance with ASTM D 445-46T using an Ubbelohde viscometer.

<Average Degree of Polymerization of Vinyl Chloride Resin>

The average degrees of polymerization of vinyl chloride resins forming vinyl chloride resin particles (a1) and vinyl chloride resin fine particles (a2) were each determined in accordance with JIS K6720-2 by dissolving the vinyl chloride resin particles (a1) or the vinyl chloride resin fine particles (a2) in cyclohexanone, measuring the viscosity thereof, and then calculating the average degree of polymerization of the vinyl chloride resin.

<Average Particle Diameter of Vinyl Chloride Resin (Fine) Particles>

The average particle diameters (volume average particle diameters) of vinyl chloride resin particles (a1) and vinyl chloride resin fine particles (a2) were each determined by dispersing the vinyl chloride resin particles or the vinyl chloride resin fine particles in a water tank, measuring and analyzing a light diffraction/scattering intensity distribution using a device shown below, and measuring particles diameters and a volume-basis particle diameter distribution to calculate the average particle diameter.

Device: Laser diffraction particle size analyzer (produced by Shimadzu Corporation, model: SALD-2300)
Measurement method: Laser diffraction and scattering
Measurement range: 0.017 μm to 2,500 μm
Light source: Semiconductor laser (wavelength 680 nm, output 3 mW)

<Fluff Adhesiveness Test>

An obtained laminate lined with a foamed polyurethane molded product was used as a sample. A test specimen having dimensions of 170 mm×300 mm was cut out from the sample and was placed on a sample platform of a Gakushin-type (color fastness) rubbing tester (produced by Daiei Kagaku Seiki Mfg. Co.; product name: RT-200) with the vinyl chloride resin molded product side of the test specimen on top. A load of 500 g was attached to the rubbing tester such that the total load on the test specimen was 500 g. Next, a single sheet of paper towel (produced by Nippon Paper Cresia Co., Ltd.; product name: COMFORT) was attached to the tip of the rubbing tester and this paper towel was rubbed back and forth 10 times against the test specimen with the paper towel in contact with the surface at the vinyl chloride resin molded product side of the test specimen. Next, in accordance with the degree of adhesion, onto the rubbed surface of the test specimen, of fibrous waste from the paper towel material, 20 locations having different degrees of adhesion were selected on the test specimen (vinyl chloride resin molded product side). A chroma meter (produced by Konica Minolta Inc.; product name: CR-400) was used to measure the difference in brightness (ΔL value) of the surface of the test specimen at each of the 20 locations before and after the rubbing test. Note that a smaller ΔL value indicates that a vinyl chloride resin molded product has better (i.e., lower) fluff adhesiveness.

<Low-Temperature Tensile Test (Initial)>

A vinyl chloride resin molded sheet obtained as a vinyl chloride resin molded product was used as a sample. The sample was punched out as a No. 1 dumbbell prescribed by JIS K 6251. The tensile stress (MPa) and tensile elongation (%) were measured in accordance with JIS K 7113 at a tension rate of 200 mm/minute and under low-temperature at −35° C. Note that a higher tensile elongation at −35° C. indicates that a vinyl chloride resin molded product has better flexibility at low temperatures.

<Low-Temperature Tensile Test (Post-Heating)>

An obtained laminate lined with a foamed polyurethane molded product was used as a sample. The sample was placed in an oven and was heated for 100 hours at an ambient temperature of 130° C. Thereafter, the foamed polyurethane layer was peeled from the sample, and then the tensile stress (MPa) and tensile elongation (%) were measured under low-temperature at −35° C. with the same conditions as previously described in "Low-temperature tensile test (initial)". Note that a higher tensile elongation at −35° C. indicates that a vinyl chloride resin molded product has better heat resistance (post-heating flexibility at low temperatures).

Examples 1 to 9 and Comparative Example 1

<Preparation of Vinyl Chloride Resin Composition>

With the exception of a trimellitate plasticizer and epoxidized soybean oil used as plasticizers and two types of vinyl chloride resin fine particles used as dusting agents A and B, the ingredients shown in Table 1 were supplied into and mixed in a Henschel mixer. The temperature of the mixture was raised to 80° C., at which point, all the plasticizers were added. The resultant mixture was then dried up by further raising the temperature thereof (i.e., the mixture changed to a dry state through absorption of the plasticizers by vinyl chloride resin particles). Thereafter, once the dried-up mixture had been cooled to 70° C. or lower, the two types of vinyl chloride resin fine particles were added as dusting agents A and B to yield a vinyl chloride resin composition for powder molding.

<Production of Vinyl Chloride Resin Molded Product>

Next, the resultant vinyl chloride resin composition for powder molding was sprinkled onto a textured mold that was heated to a temperature of 250° C. and, after being left to melt for a freely selected period of roughly 8 seconds to 20 seconds to give a vinyl chloride resin molded sheet thickness of 1 mm, excess vinyl chloride resin composition was shaken off. Thereafter, the textured mold onto which the vinyl chloride resin composition had been sprinkled was placed at rest in an oven set to a temperature of 200° C., and once 60 seconds had passed after being placed at rest, the textured mold was cooled with cooling water. Once the mold temperature had dropped to 40° C., a vinyl chloride resin molded sheet of 150 mm×200 mm×1 mm was removed from the mold as a vinyl chloride resin molded product.

The obtained vinyl chloride resin molded sheet was subjected to a low-temperature tensile test (initial) according to the method set forth above. The results are shown in Table 1.

<Production of Laminate>

Two obtained vinyl chloride resin molded sheets were placed in a mold of 200 mm×300 mm×10 mm such as not to overlap one another and with the textured surface underneath.

A polyol mixture was separately prepared from 50 parts by mass of a propylene glycol propylene oxide/ethylene oxide (PO/EO) block adduct (hydroxyl value 28, terminal EO unit content 10%, internal EO unit content 4%), 50 parts by mass of a glycerin PO/EO block adduct (hydroxyl value 21, terminal EO unit content 14%), 2.5 parts by mass of water, 0.2 parts by mass of an ethylene glycol solution of triethylenediamine (produced by Tosoh Corporation, product name: TEDA-L33), 1.2 parts by mass of triethanolamine, 0.5 parts by mass of triethylamine, and 0.5 parts by mass of a foam stabilizer (produced by Shin-Etsu Chemical Co., Ltd., product name: F-122). A mixed solution was then prepared by mixing the obtained polyol mixture with polymethylene polyphenylene polyisocyanate (polymeric MDI) in a ratio determined to give an isocyanate index of 98. The prepared mixed solution was poured onto the two vinyl chloride resin molded sheets that had been placed in the mold as described above. Thereafter, the mold was covered with a 348 mm×255 mm×10 mm aluminum plate to seal the mold. After the mold had been sealed for 5 minutes, a laminate was removed from the mold. In the obtained laminate, a surface skin formed by a vinyl chloride resin molded sheet of 1 mm in thickness was lined with a foamed polyurethane molded product having a thickness of 9 mm and a density of 0.18 g/cm$^3$.

The obtained laminate was subjected to a fluff adhesiveness test and a low-temperature tensile test (post-heating) according to the methods set forth above. The results are shown in Table 1.

TABLE 1

| | | Example 1 | Example 2 | Example 3 | Example 4 | Example 5 | Example 6 | Example 7 | Example 8 | Example 9 | Comparative Example 1 |
|---|---|---|---|---|---|---|---|---|---|---|---|
| Composition (parts by mass) | Vinyl chloride resin particles[1] | 100.0 | 100.0 | 100.0 | 100.0 | 100.0 | 100.0 | 100.0 | 100.0 | 100.0 | 100.0 |
| | Trimellitate plasticizer[2] | 110.0 | 110.0 | 110.0 | 110.0 | 110.0 | 110.0 | 110.0 | 110.0 | 110.0 | 110.0 |
| | Epoxidized soybean oil[3] | 5.00 | 5.00 | 5.00 | 5.00 | 5.00 | 5.00 | 5.00 | 5.00 | 5.00 | 5.00 |
| | Perchloric acid-treated hydrotalcite (substitution ratio 90 mol %)[4] | 4.56 | 4.56 | 4.56 | 4.56 | 4.56 | 4.56 | 4.56 | 4.56 | 4.56 | 4.56 |
| | Zeolite[5] | 2.42 | 2.42 | 2.42 | 2.42 | 2.42 | 2.42 | 2.42 | 2.42 | 2.42 | 2.42 |
| | Stearoylbenzoylmethane (β-diketon)[6] | 0.49 | 0.49 | 0.49 | 0.49 | 0.49 | 0.49 | 0.49 | 0.49 | 0.49 | 0.49 |
| | Zinc stearate[7] | 0.20 | 0.20 | 0.20 | 0.20 | 0.20 | 0.20 | 0.20 | 0.20 | 0.20 | 0.20 |
| | Light stabilizer[8] | 0.20 | 0.20 | 0.20 | 0.20 | 0.20 | 0.20 | 0.20 | 0.20 | 0.20 | 0.20 |
| | Phosphite antioxidant[9] | 0.60 | 0.60 | 0.60 | 0.60 | 0.60 | 0.60 | 0.60 | 0.60 | 0.60 | 0.60 |
| | 12-Hydroxystearic acid[10] | 0.40 | 0.40 | 0.40 | 0.40 | 0.40 | 0.40 | 0.40 | 0.40 | 0.40 | 0.40 |
| | Silanol-modified silicone oil (viscosity 60 cs)[11] | 0.40 | 1.50 | 3.00 | — | — | — | — | — | — | — |
| | Silicone oil (viscosity 1 × 10$^4$ cs)[12] | — | — | — | 1.50 | — | — | — | — | — | — |
| | Silicone oil (viscosity 10 × 10$^4$ cs)[13] | — | — | — | — | 1.50 | — | — | — | — | — |
| | Silicone oil (viscosity 30 × 10$^4$ cs)[14] | — | — | — | — | — | 1.50 | — | — | — | — |

TABLE 1-continued

|  |  |  | Example 1 | Example 2 | Example 3 | Example 4 | Example 5 | Example 6 | Example 7 | Example 8 | Example 9 | Comparative Example 1 |
|---|---|---|---|---|---|---|---|---|---|---|---|---|
|  |  | Silicone oil (viscosity 100 × 10⁴ cs)[15] | — | — | — | — | — | — | 0.40 | 1.50 | 3.00 | — |
|  |  | Dusting agent A (vinyl chloride resin fine particles)[16] | 12.00 | 12.00 | 12.00 | 12.00 | 12.00 | 12.00 | 12.00 | 12.00 | 12.00 | 12.00 |
|  |  | Dusting agent B (vinyl chloride resin fine particles)[17] | 8.00 | 8.00 | 8.00 | 8.00 | 8.00 | 8.00 | 8.00 | 8.00 | 8.00 | 8.00 |
|  |  | Pigment[18] | 3.70 | 3.70 | 3.70 | 3.70 | 3.70 | 3.70 | 3.70 | 3.70 | 3.70 | 3.70 |
| Evaluation category |  | Fluff adhesiveness [ΔL] | 1.9 | 1.6 | 0.6 | 0.4 | 0.5 | 0.6 | 1.2 | 0.5 | 0.2 | 2.8 |
|  | Low-temperature tensile test | Tensile stress (initial) at −35° C. [MPa] | 23.0 | 22.5 | 22.5 | 22.5 | 22.5 | 24.0 | 24.0 | 24.0 | 24.0 | 22.5 |
|  |  | Tensile stress (after 100 hours heating) at −35° C. [MPa] | 26.0 | 26.0 | 24.0 | 25.5 | 26.0 | 26.5 | 26.5 | 26.5 | 26.5 | 26.0 |
|  |  | Tensile elongation (initial) at −35° C. [%] | 170 | 180 | 180 | 180 | 180 | 170 | 180 | 180 | 170 | 180 |
|  |  | Tensile elongation (after 100 hours heating) at −35° C. [%] | 140 | 140 | 150 | 150 | 140 | 140 | 140 | 140 | 140 | 140 |

[1]ZEST 2500Z (vinyl chloride resin particles (a1) obtained by suspension polymerization, average degree of polymerization 2,500, average particle diameter 130 μm) produced by Shin Dai-ichi Vinyl Corporation
[2]TRIMEX N-08 produced by Kao Corporation
[3]ADK CIZER O-130S produced by ADEKA Corporation
[4]ALCAMIZER 5 produced by Kyowa Chemical Industry Co., Ltd.
[5]MIZUKALIZER DS produced by Mizusawa Industrial Chemicals, Ltd.
[6]Karenz DK-1 produced by Showa Denko K.K.
[7]SAKAI SZ2000 produced by Sakai Chemical Industry Co., Ltd.
[8]LA-72 produced by ADEKA Corporation
[9]ADK STAB 522A produced by ADEKA Corporation
[10]ADK STAB LS-12 produced by ADEKA Corporation
[11]KF-9701 produced by Shin-Etsu Chemical Co., Ltd.
[12]KF-96H-10,000cs produced by Shin-Etsu Chemical Co., Ltd.
[13]KF-96H-100,000cs produced by Shin-Etsu Chemical Co., Ltd.
[14]KF-96H-300,000cs produced by Shin-Etsu Chemical Co., Ltd.
[15]KF-96H-1,000,000cs produced by Shin-Etsu Chemical Co., Ltd.
[16]ZEST PQLTX (vinyl chloride resin fine particles (a2) obtained by emulsion polymerization, average degree of polymerization 800, average particle diameter 2 μm) produced by Shin Dai-ichi Vinyl Corporation
[17]Ryuron paste 761 (vinyl chloride resin fine particles (a2) obtained by emulsion polymerization, average degree of polymerization 2,100, average particle diameter 2 μm) produced by Tosoh Corporation
[18]DA PX-1720 Black (A) produced by Dainichiseika Color and Chemicals Mfg. Co., Ltd.

The vinyl chloride resin molded products obtained through powder slush molding of the vinyl chloride resin compositions for powder molding in Examples 1 to 9 had low fluff adhesiveness. Moreover, the vinyl chloride resin molded product obtained through powder slush molding of the vinyl chloride resin composition for powder molding in Comparative Example 1, which did not contain a silicone oil (b) having a viscosity of at least 10 cs and no greater than 200×10⁴ cs, had high fluff adhesiveness.

INDUSTRIAL APPLICABILITY

The presently disclosed vinyl chloride resin composition for powder molding can be suitably used for molding a surface skin of an automobile interior material such as an automobile instrument panel or a door trim.

The invention claimed is:
1. A vinyl chloride resin composition for powder molding comprising:
a vinyl chloride resin (a); and a silicone oil (b) having a viscosity of at least 10 cs and no greater than 200×10⁴ cs, wherein
content of the silicone oil (b) having a viscosity of at least 10 cs and no greater than 200×10⁴ cs is at least 0.1 parts by mass and no greater than 10 parts by mass per 100 parts by mass of the vinyl chloride resin (a), wherein
the vinyl chloride resin (a) includes vinyl chloride resin particles (a1) having an average degree of polymerization of at least 800 and no greater than 5,000, and vinyl chloride resin fine particles (a2) having an average degree of polymerization of at least 500 and no greater than 5,000,
the vinyl chloride resin particles (a1) having an average degree of polymerization of at least 800 and no greater than 5,000 have a percentage content in the vinyl chloride resin (a) of at least 70 mass % and no greater than 100 mass %, and
the vinyl chloride resin fine particles (a2) having an average degree of polymerization of at least 500 and no greater than 5,000 have a percentage content in the vinyl chloride resin (a) of at least 0 mass % and no greater than 30 mass %.
2. The vinyl chloride resin composition for powder molding according to claim 1, further comprising a plasticizer, wherein
content of the plasticizer is at least 90 parts by mass per 100 parts by mass of the vinyl chloride resin (a).
3. The vinyl chloride resin composition for powder molding according to claim 1 used in powder slush molding.
4. A vinyl chloride resin molded product obtained through powder molding of the vinyl chloride resin composition for powder molding according to claim 1.

5. A vinyl chloride resin molded product obtained through powder slush molding of the vinyl chloride resin composition for powder molding according to claim 1.

6. The vinyl chloride resin molded product according to claim 4 for a surface skin of an automobile instrument panel.

7. A laminate comprising:
   a foamed polyurethane molded product; and
   the vinyl chloride resin molded product according to claim 4.

8. The laminate according to claim 7 for an automobile instrument panel.

9. The vinyl chloride resin composition for powder molding according to claim 1, wherein
   the silicone oil (b) has a viscosity of at least $10 \times 10^4$ cs and no greater than $200 \times 10^4$ cs.

* * * * *